July 18, 1950 G. C. PHARO 2,515,568
SPRAY PUMP
Filed July 22, 1946 2 Sheets-Sheet 1
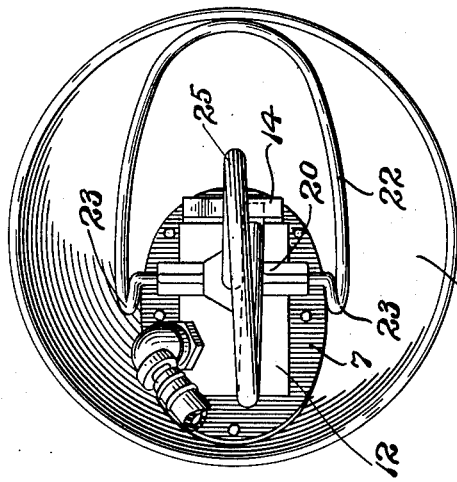
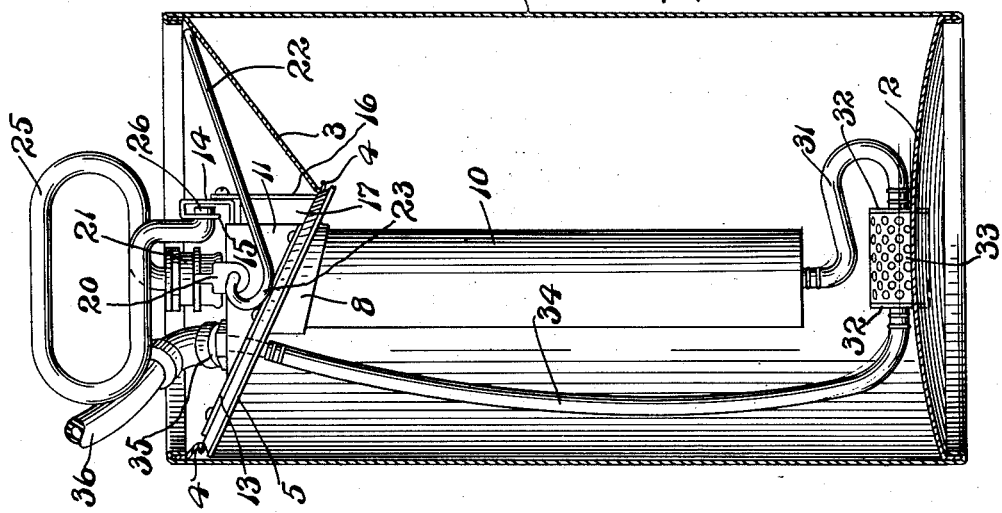
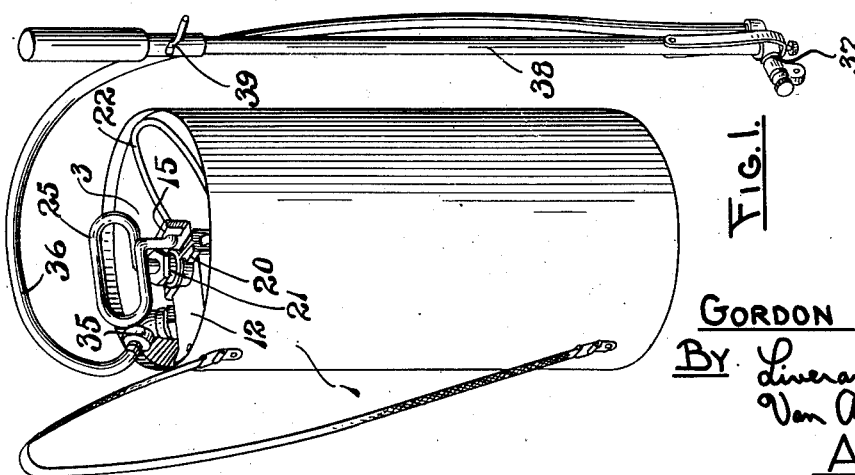
INVENTOR
GORDON C. PHARO
BY Liverance and
Van Antwerp
ATTORNEYS July 18, 1950
G. C. PHARO
2,515,568
SPRAY PUMP
Filed July 22, 1946
2 Sheets-Sheet 2
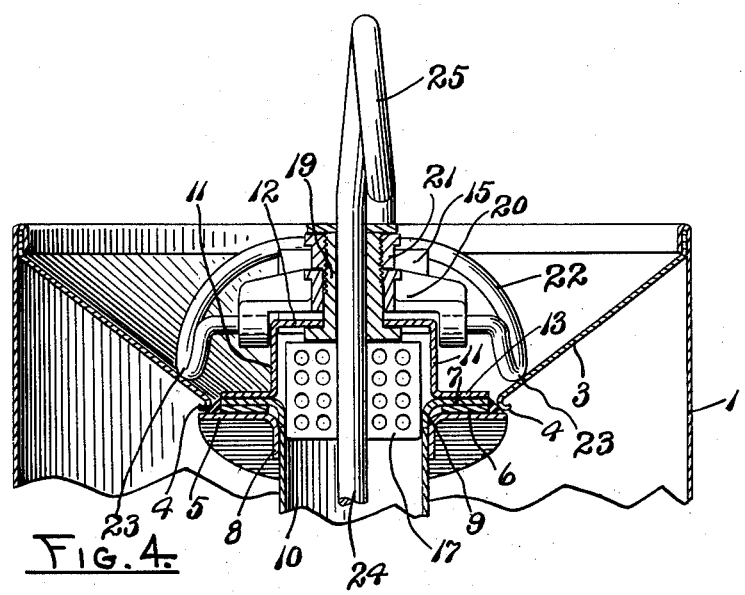
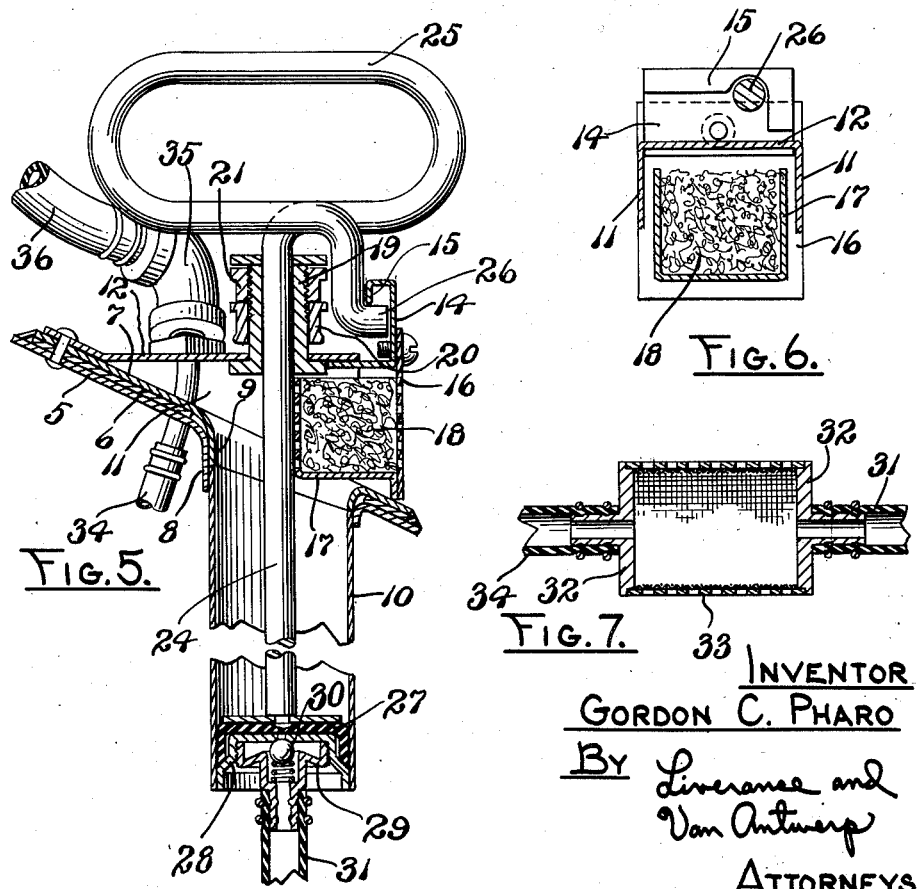
INVENTOR
GORDON C. PHARO
BY Liverance and
Van Antwerp
ATTORNEYS Patented July 18, 1950

2,515,568

UNITED STATES PATENT OFFICE 2,515,568

SPRAY PUMP

Gordon C. Pharo, Traverse City, Mich.

Application July 22, 1946, Serial No. 685,400

12 Claims. (Cl. 222—401)

This invention relates to a spray pump structure, and is primarily directed to the type of structure wherein a container or receptacle for the liquid material to be sprayed, has said spray material forced therefrom by air pressure within the tank or other container, which pressure is produced by the manual operation of an air compressor to force air into the tank and as a result, the liquid is forced out through a controlled dispensing spray nozzle therefor and directed against that which is to be sprayed. Such spray pumps may be used for spraying growing vegetables, bushes or other food plants or shrubs and may be used in many other ways, for example, in the spray treatment of poultry for the elimination of parasitical insects or the like with which they are at times infested.

With my invention, many novel improvements and betterments of structure and resulting functions are obtained.

The air pump structure is readily removed and as readily connected in place when it is to be used, extending through an opening in the top of the tank or other container and quickly secured in place or released. The top is of a form that when the air pump is removed, the opening in the top through which it passes and at which it is detachably connected, is disposed at the bottom of the top which is of a generally inverted conical form. The structure lends itself to the connection therewith of a filter for the air which is being used, eliminating dust and other undesired particles in the air. The pump structure is of a novel form so that all of the air is expelled from the pump barrel on the down stroke of its piston; and a novel construction is used for taking up the liquid from any portions immediately above the bottom of the tank and screening the liquid before it is delivered at the spray nozzle, with the utilization of a common air delivery and liquid screening member between the air outlet connection leading from the pump and the spray material conduit leading to the outside. Many novel constructions and arrangements of parts for the production of a very effective, practical, durable and economically constructed spray pump of the type mentioned will appear and be understood from the following description of a preferred embodiment of the invention, shown in the accompanying drawings, in which:

Fig. 1 is a perspective view of the spray pump structure of my invention.

Fig. 2 is a somewhat enlarged vertical section therethrough with the mechanism thereof in side elevation.

Fig. 3 is a plan view.

Fig. 4 is a fragmentary vertical section on a plane substantially at right angles to that shown in Fig. 2, of the upper portion of the structure.

Fig. 5 is a fragmentary enlarged vertical section of the air pump structure, the plane of the section being substantially the same as that shown in Fig. 2.

Fig. 6 is a vertical section through the air filter and its holder, and

Fig. 7 is a longitudinal section through the connecting member between the air outlet conduit from the pump and the liquid carrying conduit which leads to the outside of the tank.

Like reference characters refer to like parts in the different figures of the drawings.

The tank or container for the liquid spray material may comprise a vertical cylinder 1 of sheet metal, having a bottom 2 also of sheet metal permanently secured at its lower end and a sheet metal top 3 likewise permanently secured at the upper end of the body 1 of such tank. The top 3 is downwardly depressed into the upper end of the body 1 and preferably has downwardly and inwardly inclined sides approximating an inverted cone in form. In said top at one side thereof a relatively large opening of generally elliptical or oval outline is made, the metal of the top 3 being preferably return bent inwardly and downwardly providing a continuous rounded beaded edge 4 around the opening.

The opening is adapted to be closed and sealed by a closure on which the air pump structure is carried. Sheet metal plates 5, 6 and 7 (Fig. 5) are disposed in superimposed relation, one over the other, the lower plate 5 having an opening and with the metal thereof shaped and formed into a surrounding sleeve 8 which, in the spray pump unit, extends vertically downward, with the metal plates 5, 6 and 7 located at an acute angle to the horizontal, as shown in Fig. 2. The upper plate 7 likewise has an opening and the metal around it is similarly pressed downward in a sleeve at 9 within the outer sleeve 8. The pump barrel 10 positioned vertically extends into the outer sleeve 8 and butts against the end of the sleeve 9, as shown in Fig. 5, being welded, brazed or soldered in place. The plates are permanently secured together and around their edges may be brazed, soldered or otherwise equivalently secured together. The middle plate 6 has an opening therethrough for the passage of the sleeve 9. Such plates are of an oval character conforming to the outline of the opening in the top 3 and upon entering such closure through said opening, the outer welded or brazed edges thereof, are brought to bear against the bead 4 making an air-tight seal. It is, of course, understood that the dimensions of the lower plate 5 exceed the dimensions of the opening in the top 3 so that when located in operative position, the bearing against the bead 4 may be obtained, as shown in Fig. 2.

At the upper side of the plate 7 and over the open upper end of the barel 10, a member of sheet metal is located and secured. It is of a substantially channel form in cross section having triangular shaped spaced sides 11 and an integral horizontal top 12, said sides 11 at their lower edges being provided with outwardly extending flanges 13 bearing against the upper plate 7 to which they are secured in any permanent manner, by riveting, welding, brazing or the like. The end of such channel shaped member is open.

An angular bracket 14 of sheet metal has a horizontal leg thereof permanently connected with the top 12 at the opening end of said member and extends outwardly therefrom. The vertical leg of the bracket at its upper end is turned back horizontally for a short distance and then downwardly to terminate in a lip 15 of the shape best shown in Fig. 6, the use of which will be later described. At said open end of the channel member described, a vertical plate 16 is connected with the bracket 14, extending downwardly across said open end and having a large number of openings therethrough back of which a holder 17 for air filter material 18 is permanently secured. Said holder 17 has a bottom and vertical sides, the sides being perforated for air passage. Such filtering material and the holder therefore, extend partially over the open upper end of the pump barrel 10.

A vertical bushing 19, having a head at its lower end and threaded at its upper portion, extends upwardly (Fig. 4) through the top 12 of the channel member, on which a cross head 20 may be adjustably mounted and locked in any position to which adjusted by an upper lock nut 21. A bail 22 preferably formed from a single length of wire in substantially U-shape, adjacent its ends is formed with cam bends 23 as shown, the sides terminating in pintles which are rotatably mounted at opposite ends of the cross head 20. Said bail when turned to the position shown in Figs. 2 and 3 bears at the curved cam portion 23 against the inclined sides of the top 3 at opposite sides of the opening therethrough and the closure member for said opening is drawn into a secure sealing engagement with the bead 4 around the opening. Turning the bail 22 in a counterclockwise direction from the position shown in Fig. 2 releases said closure and it with the parts connected therewith, may be removed from the tank, leaving the opening in the top unobstructed so that the liquid material to be sprayed is readily delivered into the tank. The adjustment for the cross head 20 is in order to obtain the proper bearing pressure of the curved portions at 23 against the top 3 to effect a proper sealing of the opening against air escape.

A piston rod 24 extends downwardly through a bushing 19 and lengthwise of the barre 10. At its upper end it is formed into a substantially closed handle 25 as shown, the end of the rod from which the handle is formed terminating in an outward projection 26 which may be brought underneath the lip 15 and into the recess shown in Fig. 6 when said piston rod is moved to its lowermost position. When thus positioned the tank with its contents may be carried by inserting the hand through the handle 25 without the handle and rod 24 moving upward.

At the lower end of the rod 24 a piston 27 of an inverted cup leather is permanently secured which, on the upward stroke of the piston rod 24, permits passage of air through the filter 18 to below the piston, but on the down stroke said piston expands outwardly and forces the air out through an opening in the bottom closure 28 permanently secured at the lower end of the barrel 10. Said closure 28 is shaped so that the piston 27 substantially covers the upper part of said closure, forcing all of the air below the piston out through the opening therefor in the closure 28. A ball valve cage 29 is screwed into the closure 28 and carries a spring actuated ball 30 which is normally lifted to close the air passage made through said closure 28.

The cage 29 has a passage therethrough for the air and has a nipple extension around said passage for the connection of one end of the flexible tubular conduit 31. At its other end the conduit is connected with one end 32, of a housing which includes in addition a second spaced end 32 and a perforated cylindrical wall 33 between the ends which preferably is screen lined. Both of said heads 32 have passages through their ends, one in communication with the flexible conduit 31 and the other with a second flexible conduit 34 which extends upwardly through the tank 1 and is joined with a coupling 35 mounted on and carried by the top opening enclosure.

A further flexible hose conduit 36 is connected with the outer end of said coupling 35 and, as shown in Fig. 1, leads to a spray nozzle structure at 37 mounted at one end of an elongated rod 38, the nozzle being controlled by a lever indicated at 39. Such nozzle structure is no part of the present invention but is the subject matter of a separate application for patent. In the operation, with the tank substantially wholly or partly filled with the liquid which is spray dispensed, the closure for the tank top opening is located in place and sealed as described. The barrel 10 of the air pump extends downwardly (Fig. 2) into the tank. All of the mechanism of the pump is connected with said closure for the opening in the top 3. By turning the piston rod so as to release the part 26 from the lip at 15, the piston rod and piston are reciprocated to force air into the tank. The air is conducted through the hose conduit 31 into the housing having the perforated walls 33, and escapes through the wall openings thereof into the tank, going to the upper part thereof. Therefore, the upper portion of the tank contains air under pressure which, upon any opening of the nozzle at 37, forces the liquid in the tank through the openings of the wall 33 and thence out through the hose conduits 34 and 36. The liquid is screened when it passes the openings in the wall 33 by the screen at the inner side of said wall, preventing the passage of undesired materials which if passed, might interfere with the operation of the spray nozzle, clogging it against operation. Any sediment collected at the outer side of the screen is forced therefrom by the compressed air which passes therethrough from its inner side. Such housing consisting of the walls 33 and ends 32 may be moved to an indefinite number of positions over the bottom 2, and the tank may be substantially emptied before being refilled as, for example, when the liquid becomes low, the tank may be tilted for the liquid to collect at the lower part of one side thereof and such perforated wall member will follow by gravity to the lowest position of the tank where the liquid is collected.

The structure described is very practical and useful, readily manufactured and assembled and easily operated. It may be produced with economy and is of a sturdy durable construction.

The invention is defined in the appended claims and is to be considered comprehensive of all forms of structure coming within their scope.

I claim:

1. In a construction as described, a vertical tank having a bottom, a top for said tank having an opening therethrough, a closure for said opening, an air pump mounted on said closure extending into the tank, a flexible conduit connected with the lower end of the air pump for carrying the air forced from the pump, a housing having perforated walls to which said conduit is connected and into which the air is delivered, a second flexible conduit connected at one end with said housing and passing upwardly in the tank and connected with said closure and thence extending outwardly as a delivery conduit.

2. A construction as defined in claim 1, said housing being located against the bottom of the tank and movable thereover, the conduits being connected at opposite portions of the housing, and a screen within said housing lying against the perforated walls thereof.

3. In a structure as described, a vertical tank having a closed bottom and an inverted conical top closing the upper end of the tank, said top having at one side thereof a substantially oval shaped opening therethrough reaching from adjacent one side of the top to approximate the center thereof, a closure for said opening, said closure having an opening therethrough, a vertical air pump barrel extending downwardly into the tank connected with the closure and communicating at its upper end with said opening, an inverted channel connected to the upper side of said closure over the upper end of the barrel having a horizontal top and triangular shaped sizes said channel being open at one end, a manually operable piston rod extending downwardly into the barrel, a piston at the lower end of the piston rod, a vertical guide bushing carried by said channel and extending upwardly therefrom through which the piston rod passes, a cross head mounted on said bushing above the channel, and a bail of generally U-shape having its ends pivotally connected with opposite ends of the cross head, said bail adjacent its ends having downwardly extending curved cam portions adapted to bear against said top at opposite sides of the opening therethrough when the bail is turned to one position to draw said closure into sealing engagement with the top at the edges of the opening.

4. A construction as defined in claim 3, and a holder for filtering material connected with said channel member and located at the open end thereof for the passage of air therethrough into said barrel.

5. A construction as defined in claim 3, and a bracket connected with said channel member at its open end extending outwardly and upwardly therefrom and terminating in a down turned lip having a notch therein, said piston rod at its upper end portion being formed into a loop and terminating in an outwardly extending horizontal projection adapted to be brought underneath said lip and seat in said recess thereof.

6. A construction as defined in claim 3, said bushing being exteriorly threaded at its upper portion and said cross head being slidably mounted thereon, and a nut threaded on to the bushing above the cross head whereby the cross head and bail carried thereby have an adjustable range of movement.

7. In a structure as described, a vertical tank adapted to contain a liquid to be sprayed, a bottom closing the lower end of the tank, a top closing the upper end of the tank, said top having an opening therein, a closure for said opening, said closure having an opening therethrough, a pump barrel connected with said closure having its upper end in communication with the opening therethrough and normally extending vertically downward into the tank, a member closing the lower end of the pump barrel having a spring valve closed passage therethrough, a piston in the barrel, a piston rod connected therewith extending upwardly through and above the barrel, a member connected with the closure over said opening therein, a vertical guide for the piston rod connected with said member through which the rod passes, a flexible conduit connected with the bottom member of the barrel for conducting air pumped therefrom, a perforated housing connected with said conduit to which the air pumped is forced, said housing being located upon the bottom of the tank and movable thereover, a second flexible conduit connected with the housing and leading to said top opening closure, a coupling carried by said closure with which said conduit is connected, a third flexible delivery conduit connected with the coupling, and means for releasably securing the closure for said opening in the top in air sealed engagement therewith.

8. A construction as defined in claim 7, said member connected with the closure over the upper end of the barrel having an open side and a holder for filtering material disposed at said open side thereof, said holder having a perforated wall for air passage.

9. A construction as defined in claim 7, a handle at the upper end of said piston rod for manual operation of the piston and a fixed keeper member connected with said closure, said handle having a part to engage therewith upon turning the piston rod about its longitudinal axis to secure the rod against vertical movement, said rod being movable about its longitudinal axis for disengagement from said keeper.

10. In a structure as described, a vertical tank to contain a liquid to be sprayed having a bottom closing the lower end thereof, and a top closing the upper end, said top having an opening therethrough, a removable closure for said top opening, an air pump connected with said closure extending downwardly into the tank, a flexible conduit connected with the lower end of the pump at one end and with said closure at its opposite end, including a coupling means carried by said closure adapted to have a second flexible delivery conduit connected therewith and a housing having perforated walls located in the length of said first mentioned conduit, said housing being adapted to lie against the bottom of said tank and being movable thereover.

11. A construction as defined in claim 10, and a screen within the said housing adapted to come against the inner sides of the perforated walls thereof.

12. In a structure as described, a vertical tank for containing a liquid to be sprayed having a bottom closing the lower end thereof, and a top closing the upper end, said top having inwardly and downwardly inclined sides, and having an opening therethrough extending from closely adjacent an edge of the top downwardly and inwardly, said opening being located in a plane inclined to the horizontal, a closure for said opening, means for detachably securing the closure in place, and a pump mounted on said closure extending into said tank for supplying the tank with air under pressure.

GORDON C. PHARO.

REFERENCES CITED

The following references are of record in the file of this patent:

UNITED STATES PATENTS

| Number | Name | Date |
|---|---|---|
| 1,112,202 | Estes | Sept. 29, 1914 |
| 2,100,990 | Valentine | Nov. 30, 1937 |
| 2,134,985 | Parrott | Nov. 1, 1938 |
| 2,143,260 | Cuff | Jan. 10, 1939 |

FOREIGN PATENTS

| Number | Country | Date |
|---|---|---|
| 180,031 | Switzerland | Dec. 16, 1936 |